US009634890B2

United States Patent
Na et al.

(10) Patent No.: US 9,634,890 B2
(45) Date of Patent: Apr. 25, 2017

(54) POWERING OFF AND REBOOTING METHOD, DEVICE AND SYSTEM

(71) Applicant: ZTE CORPORATION, Shenzhen, Guangdong Province (CN)

(72) Inventors: Ting Na, Shenzhen (CN); Xiaojian Cao, Shenzhen (CN); Feng Jin, Shenzhen (CN); Long Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/780,556

(22) PCT Filed: Aug. 23, 2013

(86) PCT No.: PCT/CN2013/082199
§ 371 (c)(1),
(2) Date: Sep. 28, 2015

(87) PCT Pub. No.: WO2014/161262
PCT Pub. Date: Oct. 9, 2014

(65) Prior Publication Data
US 2016/0056999 A1 Feb. 25, 2016

(30) Foreign Application Priority Data
Apr. 1, 2013 (CN) .......................... 2013 1 0112344

(51) Int. Cl.
*H04B 10/03* (2013.01)
*H04L 12/24* (2006.01)
(Continued)

(52) U.S. Cl.
CPC ........ *H04L 41/0672* (2013.01); *G06F 9/4401* (2013.01); *G06F 9/442* (2013.01);
(Continued)

(58) Field of Classification Search
CPC ..................................................... H04B 10/03
See application file for complete search history.

(56) References Cited

U.S. PATENT DOCUMENTS

| 2008/0037535 A1 | 2/2008 | Yoon et al. | |
|---|---|---|---|
| 2009/0228696 A1* | 9/2009 | McKelvey | G06F 11/1417 713/2 |

(Continued)

FOREIGN PATENT DOCUMENTS

| CN | 101854498 A | 10/2010 |
|---|---|---|
| CN | 102833392 A | 12/2012 |
| CN | 102929734 A | 2/2013 |

*Primary Examiner* — Shi K Li
(74) *Attorney, Agent, or Firm* — Ling Wu; Stephen Yang; Ling and Yang Intellectual Property

(57) ABSTRACT

Disclosed are a powering off and rebooting method, apparatus and system. Wherein, the method includes: an office-end device monitoring a user-end access device; and when the office-end device monitors that the user-end access device is halted, sending a reboot command to the user-end access device; wherein the reboot command is used for indicating a power supply module in the user-end access device to perform a powering off and rebooting operation on the user-end access device. The abovementioned solution solves the problem in the related art that technical personnel have to go to the site to reboot a device if the software reset is invalid when the device is halted, so that research and development technical personnel can timely and easily power off and reboot the device without going to the site, thus treating a failure timely and reducing maintenance costs, and improving the operability and maintenance efficiency of maintenance personnel.

5 Claims, 3 Drawing Sheets

(51) Int. Cl.
*H04L 29/14* (2006.01)
*G06F 9/44* (2006.01)
*H04Q 11/00* (2006.01)

(52) U.S. Cl.
CPC ......... *H04L 69/40* (2013.01); *H04Q 11/0067* (2013.01); *H04Q 2011/0081* (2013.01)

(56) References Cited

U.S. PATENT DOCUMENTS

| | | |
|---|---|---|
| 2013/0031379 A1 | 1/2013 | Wacker |
| 2014/0233940 A1* | 8/2014 | Pitzer .................... H04B 10/03 398/8 |

* cited by examiner

POWERING OFF AND REBOOTING METHOD, DEVICE AND SYSTEM

TECHNICAL FIELD

The present document relates to the field of broadband access, and more particularly, to a powering off and rebooting method, apparatus and system.

BACKGROUND OF THE RELATED ART

With the popularity of broadband access to millions of households, applications of user-end access device are throughout almost every corner of the society. With the increasingly widespread applications of the device, research and development technical personnel need to spend more energy to maintain and upgrade the device, and in most cases, the technical personnel can upgrade and maintain the system by means of remote control, but if the system is halted, the system does not respond to the remote control, and resetting and rebooting the system via the remote software are invalid, and the Central Processing Unit (referred to as CPU) small system in the system is fully halted. In this case, the system can only be powered off and rebooted via the hardware to make the system re-run and perform following operations.

In such cases, technical personnel can only power off and reboot the device at the site, which makes the maintenance efficiency greatly reduced, because in order to adapt to the needs of different users, structures and functions of the user-end access device are diverse, and in terms of the structure, some devices are hung high in the wild, and some other devices are placed in residential buildings, if comparing the device structures in the both cases, it can be found that the tightness of the devices hanging high in the wild must be very good, and must prevent dust and rainwater in the outside world from entering into the devices and affecting their working When these devices need to be powered off and rebooted, because the tightness is very good, the placement is special, it increases the operation difficulty for the technical personnel and lowers the maintenance efficiency.

Aiming at the problem in the related art that the software reset is invalid when a device is halted, and the technical personnel can only reboot the device at the site, currently no effective solution has been raised yet.

SUMMARY

Aiming at the problem in the related art that software resetting is invalid when a device is halted, and technical personnel can only reboot the device at the site, the present document provides a powering off and rebooting method, apparatus and system to solve the abovementioned technical problem.

According to one aspect of the present document, the present document provides a powering off and rebooting method, wherein the method comprises: an office-end device monitoring a user-end access device; when the office-end device monitors that the user-end access device is halted, sending a reboot command to the abovementioned user-end access device; wherein the reboot command is used for indicating a power supply module in the user-end access device to perform a powering off and rebooting operation on the abovementioned user-end access device.

Preferably, the abovementioned office-end device sending a reboot command to the abovementioned user-end access device comprises: the abovementioned office-end device sending the abovementioned reboot command to a passive optical network media access control (PON MAC) chip in the user-end access device, wherein the abovementioned reboot command is a software command to reboot the system; the abovementioned PON MAC chip parsing the abovementioned reboot command into a hardware reset signal, and transmitting the abovementioned hardware reset signal to a main control board through a connector; the abovementioned main control board shaping the abovementioned hardware reset signal to a reset signal meeting requirements of the abovementioned power supply module, and sending the abovementioned reset signal to the power supply module.

Preferably, after the office-end device sends the reboot command to the user-end access device, the method further comprises: after receiving the abovementioned reset signal, the power supply module cutting off the power supply to the user-end access device, and restoring the power supply to the user-end access device after a specified time.

According to another aspect of the present document, the present document further provides a powering off and rebooting apparatus, applied to an office-end device, wherein, the apparatus comprises: a monitoring module, configured to: monitor a user-end access device; a reboot command sending module, configured to: after monitoring that the user-end access device is halted, send a reboot command to the user-end access device; wherein the reboot command is used for indicating a power supply module in the user-end access device to perform a powering off and rebooting operation on the user-end access device.

According to still another aspect of the present document, the present document further provides a powering off and rebooting apparatus, applied to a user-end access device, wherein the apparatus comprises: a passive optical network (referred to as PON) Medium Access Control (referred to as MAC) chip on the media access control layer in a passive optical network, a connector, a main control board, and a power supply module, wherein the PON MAC chip is configured to: receive a reboot command sent by an office-end device, parse the reboot command into a hardware reset signal, then send the hardware reset signal through the connector to the main control board; the connector is configured to: connect the PON MAC chip with the abovementioned main control board; the abovementioned main control board is configured to: receive the hardware reset signal sent by the PON MAC chip through the connector, shape the abovementioned hardware reset signal to a reset signal meeting requirements of the power supply module, and then send the reset signal to the power supply module; the power supply module is configured to: after receiving the reset signal sent by the main control board, cut off the power supply to the user-end access device, and restore the power supply to the user-end access device after a specified time.

According to still another aspect of the present document, the present document further provides a powering off and rebooting system, wherein the system comprises: the powering off and rebooting apparatus applied to an office-end device, as well as the powering off and rebooting apparatus applied to a user-end access device.

Through the embodiment of the present document, when monitoring that the user-end access device is halted, the office-end device sends a reboot command to the user-end access device, the user-end access device has a power supply module, and the reboot command is used to indicate the power supply module to perform a powering off and rebooting operation on the user-end access device, thus solving the problem in the related art that a software reset is invalid when the device is halted, and the technical personnel can only reboot the device at the site, so that the research and development technical personnel can power off and reboot the device conveniently without going to the site, thus timely treating the failure and saving maintenance costs, and improving the operability and maintenance efficiency of maintenance personnel.

The abovementioned description is only an overview of the technical solution of the present document, and in order to more clearly understand the technical means of the present document, it can be implemented in accordance with the content of the specification, and in order to make the abovementioned and other objectives, features and advantages of the present document more fully understood, the specific embodiments of the present document will be illustrated in the following.

PREFERRED EMBODIMENTS OF THE INVENTION

In the related art, when a device is halted, the remote reset relies on the software to achieve, under the condition that a small system is normal, when the CPU small system is halted, it does not respond to the remote control, and the mode in which the remote reset relies on the software in this case reflects its own limitations. Therefore, the embodiment of the present document provides a powering-off and rebooting method, apparatus and system to control the reboot of a power supply of the device through a hardware mode, so that the board reboot does not rely on small systems, and has better usability and versatility. In the following, the accompanying drawings and embodiments will be used to describe the present document in further detail. It should be understood that the specific embodiments described herein are only for explaining rather than limiting the present document.

Figure 1:
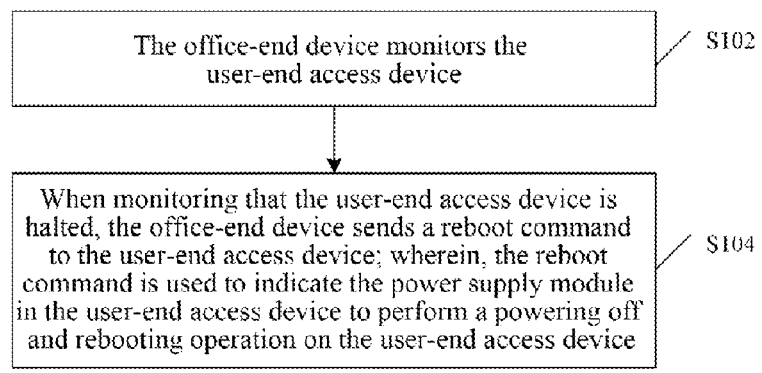
FIG. 1 is a flow chart of a powering off and rebooting method in accordance with an embodiment of the present document.

The present embodiment provides a powering off and rebooting method, and the method can be implemented at the office-end device side, FIG. 1 is a flow chart of the powering off and rebooting method in accordance with an embodiment of the present document, and as shown in FIG. 1, the method comprises the following steps (Steps S102-S104):

in step S102, the office-end device monitors the user-end access device;

in step S104, when monitoring that the user-end access device is halted, the office-end device sends a reboot command to the user-end access device; wherein the reboot command is used to indicate the power supply module in the user-end access device to perform a powering off and rebooting operation on the user-end access device.

Through the abovementioned method, when monitoring that the user-end access device is halted, the office-end device sends a reboot command to the user-end access device, and the user-end access device has a power supply module, and the abovementioned reboot command is used to indicate the power supply module to perform a powering off and rebooting operation on the user-end access device, thus solving the problem in the related art that the software reset is invalid when the device is halted, and technical personnel can only reboot the device at the site, so that the research and development technical personnel can power off and restart the device conveniently without going to the site, so as to timely treat the failure and save the maintenance costs, and improve the operability and maintenance efficiency of the maintenance personnel.

Figure 2:
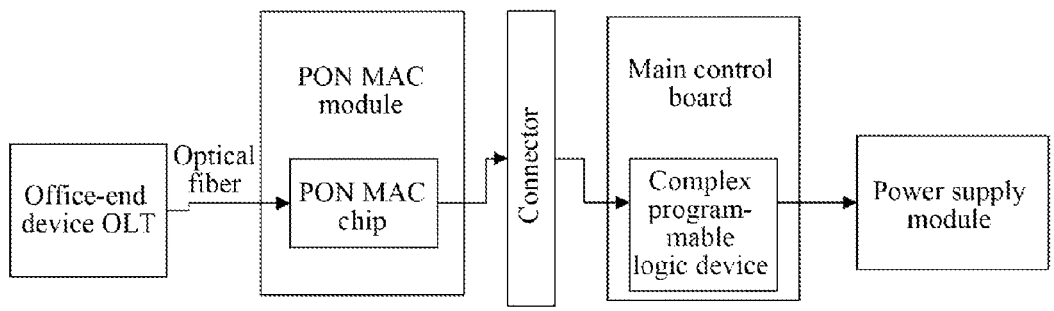
FIG. 2 is a schematic diagram of a hardware structure of an office-end device and a user-end access device in a powering off and rebooting process in accordance with an embodiment of the present document.

FIG. 2 is a schematic diagram of the hardware structure of an office-end device and a user-end access device in the powering off and rebooting process in accordance with an embodiment of the present document, as shown in FIG. 2, the office-end device is connected to the user-end access device through the fiber optic cable, and the user-end access device comprises: a PON MAC chip, a connector, a main control board, a programmable logic device thereon, and a power supply module. Specifically:

the office-end device OLT can remotely control the user-end device, and can perform operations such as software version upgrade on the device when the user-end access device operates normally in the routine. When the user-end access device is halted, the routine remote control is invalid, and in this case, the office-end device sends a software command for rebooting the system to the user-end access device via the fiber optical cable.

The fiber optical cable connected with the office-end device and is used for transmitting the software commands, when the user-end access device is halted, the office-end device sends a software command for rebooting the system to the user-end access device via the fiber optical cable.

The PON MAC module parses the command after the PON MAC chip in the module receives the software command of rebooting the system, and generates a hardware reset signal RST1 for rebooting the user-end device. In short, herein the role of the PON MAC chip is to convert the software command of rebooting the system into a hardware signal.

The connector plays the role of connecting the main control board and the PON MAC MPU module in the user-end device, and is a bridge of signal transmission between the PON MAC chip and the main control board, and can transmit the hardware reset signal parsed out by the PON MAC chip to the main control board. It transmits the hardware reset signal RST1 parsed out by the PON MAC chip to the programmable logic device on the main control board.

As for the main control board and the programmable logic device thereon, after receiving the hardware reset signal RST1, the programmable logic device shapes it to a reset signal RST2 needed by the power supply module.

As for the power supply module in the user-end access device, the power supply module provides a reset pin for the device, after receiving the reset signal RST2 which meets its requirements, the power supply module automatically cuts off the power supply to the device and restores the power supply after a few seconds, and makes the user-end access device reboot.

Next, the process of using the abovementioned hardware to power off and reboot will be introduced. The user-end access device selects to use the PON MAC chip to receive the software command, and parses the software command into a hardware reset signal. This is because, according to its function, the user-end access device can be divided into multiple types, such as 1 GEPON access device, 10 GEPON access device, and so on. But all these devices with different functions have the PON MAC chip. Selecting the PON MAC chip to receive commands from the office-end can make the present document more universal. Moreover, the PON MAC chip is used to parse this software command because it is independent of the CPU small system in the device, and the PON MAC chip is not affected when the device is halted.

After receiving this signal, the programmable logic device on the main control board is responsible for shaping the reset signal and converting it into a reset signal meeting the needs of the power supply module. Herein it is necessary to note that this programmable logic device is not a special need of the embodiment of the present document, but an indispensable functional device on the main control board of the user-end access device, the present embodiment only utilizes this feature, and uses local materials, so there is no problem of introducing extra devices and increasing device costs. In addition, the logic implementation of shaping the reset signal is not complicated, and there is no problem of occupying too many programmable logic device resources.

The power supply module can receive a reset signal with a particular waveform to make itself cut off the power supply to the user-end access device, and automatically restore the power supply after a certain time period, so as to achieve the purpose of powering off and rebooting the device. The power supply module has good stability, because the waveform of its received reset signal is specified, even if there have been some interference pulses on the reset control line, the power supply module can also identify it, thus avoiding a wrong power off and ensuring the device stability. Currently, the power supply module has been widely used in broadband access devices.

According to the hardware structure of the office-end device and the user-end access device introduced in FIG. 2, in the following, the powering off and rebooting method according to the present embodiment will be further described. Preferably, the office-end device sends a reboot command to the user-end access device, which can be achieved through the following preferred embodiment: the office-end device sends the reboot command to the PON MAC chip in the user-end access device; wherein the reboot command is a software command of rebooting the system; the PON MAC chip parses the reboot command into a hardware reset signal, and transmits the hardware reset signal to the main control board via a connector; the main control board shapes the hardware reset signal into a reset signal meeting the needs of the power supply module, and sends the reset signal to the power supply module.

After the office-end device sends a reboot command to the user-end access device, the method further comprises: after receiving a reset signal, the power supply module cutting off the power supply to the user-end access device, and restoring the power supply to the user-end access device after a specified time period.

The present embodiment takes the existing hardware framework of the user-end access device as the basis, the implementation has a simple structure, good operability, and does not increase device cost. The introduced PON MAC chip parsing mechanism is based on the original PON MAC chip to modify the internal software to produce a hardware reset signal. Moreover, the programmable logic device that shapes the signal is also an indispensable functional chip in the user-end access device, and is not an extra device.

Figure 3:
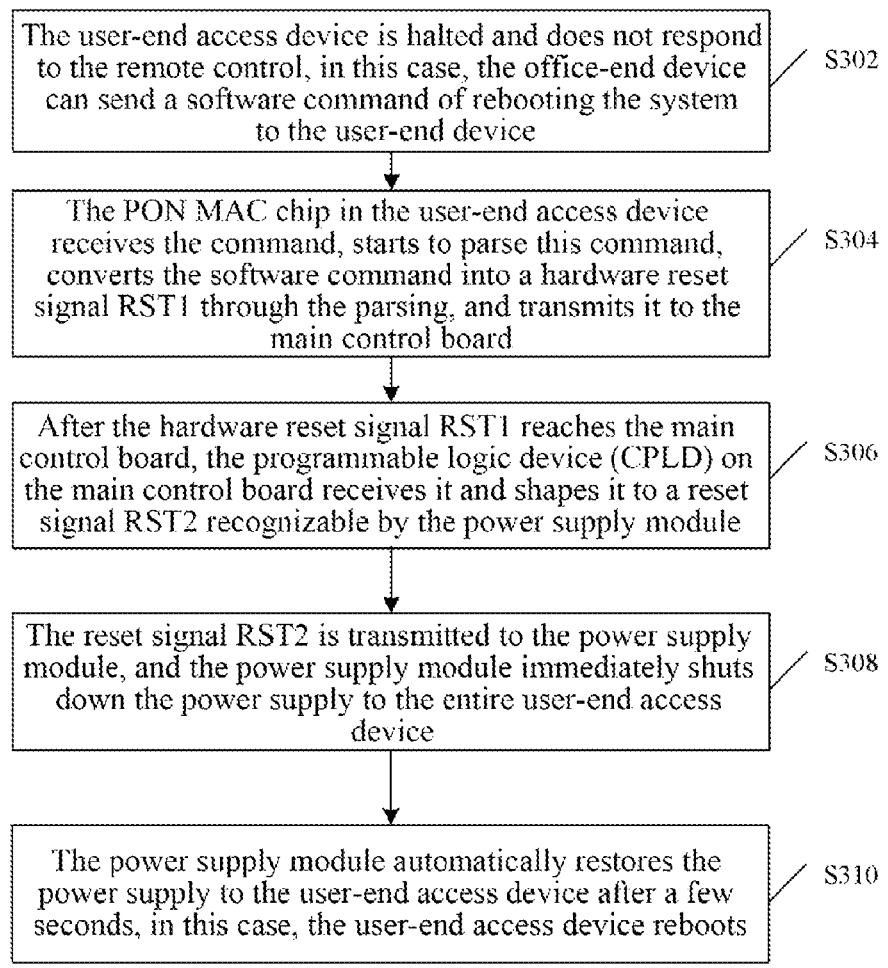
FIG. 3 is a flow chart of the operation of remotely powering off and rebooting the user-end access device in accordance with an embodiment of the present document.

FIG. 3 is a flow chart of the operation of remotely powering off and rebooting the user-end access device accordance with the embodiment of the present document, as shown in FIG. 3, the process comprises the following steps (steps S302-S310):

in step S302, the user-end access device is halted and does not respond to the remote control, in this case, the office-end device can send a software command of rebooting the system to the user-end device.

In step S304, the PON MAC chip in the user-end access device receives the command, starts to parse this command, converts the software command into a hardware reset signal RST1 through parsing, and transmits it to the main control board.

In step S306, after the hardware reset signal RST1 reaches the main control board, the programmable logic device (CPLD) on the main control board receives it and shapes it to a reset signal RST2 recognizable by the power supply module.

In step S308, the reset signal RST2 is transmitted to the power supply module, and the power supply module immediately shuts down the power supply to the entire user-end access device.

In step S310, the power supply module automatically restores the power supply to the user-end access device after a few seconds, in this case, the user-end access device reboots.

Figure 4:
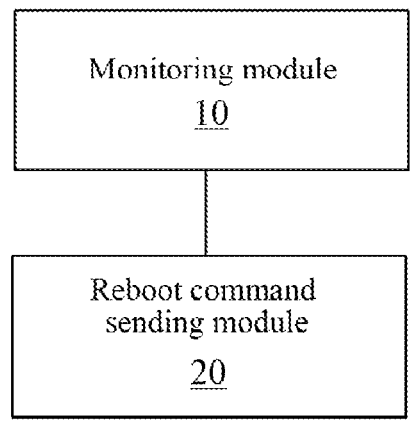
FIG. 4 is a block diagram of a powering off and rebooting apparatus applied to an office-end device in accordance with an embodiment of the present document.

Corresponding to the powering off and rebooting method introduced in the abovementioned embodiment, the present embodiment provides a powering off and rebooting apparatus, and the apparatus may be provided at the office-end device side to achieve the abovementioned embodiment. FIG. 4 is a block diagram of the powering off and rebooting apparatus applied to the office-end device in accordance with an embodiment of the present document, and as shown in FIG. 4, the apparatus comprises: monitoring module 10 and a reboot command sending module 20. The structure will be described in detail in the following.

The monitoring module 10 is used to: monitor the user-end access device;

the reboot command sending module 20 is connected to the monitoring module 10 and is used to: after monitoring that the abovementioned user-end access device is halted, send a reboot command to the user-end access device; wherein the reboot command is used for indicating the power supply module in the user-end access device to perform a powering off and rebooting operation on the user-end access device.

Through the abovementioned apparatus, when monitoring that the user-end access device is halted, the office-end device sends a reboot command to the user-end access device, the user-end access device has a power supply module, and the abovementioned reboot command is used to indicate the power supply module to perform a powering off and rebooting operation on the user-end access device, thus solving the problem in the related art that the software reset is invalid when the device is halted and the technical personnel can only reboot the device at the site, so that the research and development technical personnel can power off and reboot the device conveniently without going to the site, thus timely treating the failure and saving maintenance costs, and improving the operability and maintenance efficiency of maintenance personnel.

Figure 5:
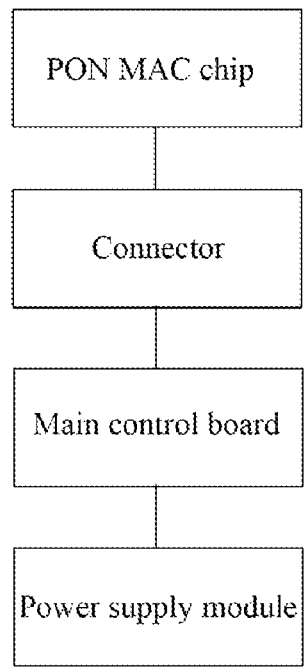
FIG. 5 is a block diagram of a powering off and rebooting apparatus applied to the user-end access device in accordance with an embodiment of the present document.

Corresponding to the powering off and rebooting method introduced in the abovementioned embodiment, the present embodiment provides a powering off and rebooting apparatus, and the apparatus can be provided at the user-end access device to implement the abovementioned embodiment. FIG. 5 is a block diagram of a power off and rebooting apparatus in the user-end access device in accordance with the embodiment of the present document, as shown in FIG. 5, the apparatus comprises: a PON MAC chip, a connector, a main control board, and a power supply module, wherein the PON MAC chip is used to: receive a reboot command sent by an office-end device, parse the abovementioned reboot command into a hardware reset signal, then send the abovementioned hardware reset signal to the main control board through the connector;

the connector is used to connect the PON MAC chip with the main control board;

the main control board is used to receive the hardware reset signal sent by the PON MAC chip through the connector, shape the hardware reset signal to a reset signal meeting the requirements of the power supply module, and then send the reset signal to the power supply module;

the power supply module is used to: after receiving the reset signal sent by the main control board, cut off the power supply to the user-end access device, and restore the power supply to the user-end access device after a specified time period.

Figure 6:
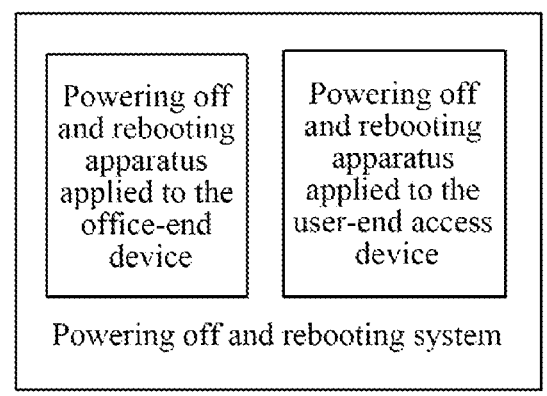
FIG. 6 is a block diagram of a powering off and rebooting system in accordance with an embodiment of the present document.

Corresponding to the powering off and rebooting apparatus applied in the office-end device and introduced in the abovementioned embodiment, and the powering off and rebooting apparatus applied in the user-end access device, the present embodiment provides a powering off and rebooting system, FIG. 6 is a block diagram of the powering off and rebooting system in accordance with an embodiment of the present document, and as shown in FIG. 6, the system comprises: the powering off and rebooting apparatus applied to the abovementioned office-end device, as well as the powering off and rebooting apparatus applied to the abovementioned user-end access device.

From the above description, it can be seen that the embodiment of the present document, on the basis of the existing hardware framework of the user-end access device, provides a method for remotely powering off and rebooting the device in the case that the user-end access device does not respond to the remote control, and it is invalid to reset and reboot the system through a remote software. This method can solve the powering off and rebooting problem when the CPU small system in the device is fully halted, it has good flexibility, and is easy to operate, and it can greatly improve the maintenance efficiency of the device. The present document may be applied to the broadband access system, and can be used to remotely power off and reboot the user-end access device, and it has the feature of remotely powering off and rebooting the device in the case that the remote reset of the device is invalid and the small system is completely halted.

Although for the purposes of illustration, the preferred embodiments of the present document have been disclosed, those skilled in the art will appreciate that various improvements, additions and substitutions are possible, and therefore, the scope of the present document should not be limited to the abovementioned embodiments.

INDUSTRIAL APPLICABILITY

Through the embodiment of the present document, when monitoring that the user-end access device is halted, an office-end device sends a reboot command to a user-end access device, the user-end access device has a power supply module, and the reboot command is used to indicate the power supply module to perform a powering off and rebooting operation on the user-end access device, thus solving the problem in the related art that a software reset is invalid when the device is halted, and the technical personnel can only reboot the device at the site, so that the research and development technical personnel can power off and reboot the device conveniently without going to the site, thus timely treating the failure and saving maintenance costs, and improving the operability and maintenance efficiency of maintenance personnel.

What is claimed is:

1. A powering off and rebooting method, wherein, the method comprises:

an office-end device monitoring a user-end access device;

when monitoring that the user-end access device is halted, the office-end device sending a reboot command to the user-end access device; wherein the reboot command is used for indicating a power supply module in the user-end access device to perform a powering off and rebooting operation on the user-end access device;

wherein, the office-end device sending a reboot command to the user-end access device comprises:

the office-end device sending the reboot command which is a software command to reboot a system to a passive optical network media access control (PON MAC) chip in the user-end access device;

the PON MAC chip parsing the software reboot command and converting the software reboot command into a hardware reset signal, and transmitting the hardware reset signal to a main control board through a connector;

a programmable logic device on the main control board receiving the hardware reset signal and shaping the hardware reset signal to a reset signal recognizable by the power supply module, and the main control board sending the reset signal to the power supply module.

2. The method of claim 1, wherein, after the office-end device sends the reboot command to the user-end access device, the method further comprises:

after receiving the reset signal, the power supply module cutting off the power supply to the user-end access device, and restoring the power supply to the user-end access device after a specified time period.

3. A powering off and rebooting apparatus, applied to an office-end device, wherein, the apparatus comprises:

a monitoring module, configured to: monitor a user-end access device;

a reboot command sending module, configured to: after monitoring that the user-end access device is halted, send a reboot command to the user-end access device; wherein the reboot command is used for indicating a power supply module in the user-end access device to perform a powering off and rebooting operation on the user-end access device, wherein, sending the reboot command to the user-end access device comprises:

sending the reboot command which is a software command to reboot a system to a passive optical network media access control (PON MAC) chip in the user-end access device;

the PON MAC chip parsing the software reboot command and converting the software reboot command into a hardware reset signal, and transmitting the hardware reset signal to a main control board through a connector;

a programmable logic device on the main control board receiving the hardware reset signal and shaping the hardware reset signal to a reset signal recognizable by the power supply module, and the main control board sending the reset signal to the power supply module.

4. A powering off and rebooting apparatus, applied to a user-end access device, wherein, the apparatus comprises: a passive optical network Medium Access Control (PON MAC) chip, a connector, a main control board, and a power supply module, wherein, the PON MAC chip is configured to: receive a reboot command which is a software command to reboot a system sent by an office-end device, parse the software reboot command and convert the software reboot command into a hardware reset signal, then send the hardware reset signal through the connector to the main control board;

the connector is configured to: connect the PON MAC chip and the main control board;

the main control board comprises a programmable logic device and the programmable logic device is configured to: receive the hardware reset signal sent by the PON MAC chip through the connector, shape the hardware reset signal to a reset signal recognizable by the power supply module, and the main control board is configured to send the reset signal to the power supply module;

the power supply module is configured to: after receiving the reset signal sent by the main control board, cut off the power supply to the user-end access device, and restore the power supply to the user-end access device after a specified time period.

5. A powering off and rebooting system, wherein the system comprises a powering off and rebooting apparatus applied to an office-end device as well as a powering off and rebooting apparatus applied to a user-end access device, wherein, the powering off and rebooting apparatus applied to an office-end device comprises:

a monitoring module, configured to: monitor a user-end access device;

a reboot command sending module, configured to: after monitoring that the user-end access device is halted, send a reboot command to the user-end access device; wherein the reboot command is used for indicating a power supply module in the user-end access device to perform a powering off and rebooting operation on the user-end access device;

and the powering off and rebooting apparatus applied to a user-end access device comprises: a passive optical network Medium Access Control (PON MAC) chip, a connector, a main control board, and a power supply module, wherein, the PON MAC chip is configured to: receive the reboot command which is a software command to reboot a system sent by the office-end device, parse the software reboot command and convert the software reboot command into a hardware reset signal, then send the hardware reset signal through the connector to the main control board;

the connector is configured to: connect the PON MAC chip and the main control board;

the main control board comprises a programmable logic device and the programmable logic device is configured to: receive the hardware reset signal sent by the PON MAC chip through the connector, shape the hardware reset signal to a reset signal recognizable by the power supply module, and the main control board is configured to send the reset signal to the power supply module;

the power supply module is configured to: after receiving the reset signal sent by the main control board, cut off the power supply to the user-end access device, and restore the power supply to the user-end access device after a specified time period.

* * * * *